(12) United States Patent
Sassa

(10) Patent No.: US 7,005,492 B2
(45) Date of Patent: Feb. 28, 2006

(54) COPOLYMER RUBBER, AND FOAMED ARTICLE, VULCANIZED RUBBER, PROFILE EXTRUSION MOLDED RUBBER AND HOSE FOR WATER COMPRISING SAID COPOLYMER RUBBER

(75) Inventor: Tatsuo Sassa, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 237 days.

(21) Appl. No.: 10/721,871

(22) Filed: Nov. 26, 2003

(65) Prior Publication Data

US 2004/0106760 A1 Jun. 3, 2004

(30) Foreign Application Priority Data

| Dec. 3, 2002 | (JP) | ............................ 2002-350953 |
| Dec. 3, 2002 | (JP) | ............................ 2002-350954 |
| Dec. 3, 2002 | (JP) | ............................ 2002-350955 |
| Mar. 6, 2003 | (JP) | ............................ 2003-059599 |
| Mar. 6, 2003 | (JP) | ............................ 2003-059600 |

(51) Int. Cl.
*C08F 210/18* (2006.01)

(52) U.S. Cl. ...................... 526/336; 526/282; 526/283; 524/554; 521/150; 428/36.8

(58) Field of Classification Search ................. 526/282, 526/283, 336; 524/554; 521/150; 428/36.8

See application file for complete search history.

(56) References Cited

U.S. PATENT DOCUMENTS

| 4,259,468 A | * | 3/1981 | Kajiura et al. ............... 526/283 |
| 5,728,766 A | | 3/1998 | Schauder et al. |
| 6,465,584 B1 | | 10/2002 | Evens et al. |
| 6,716,931 B1 | * | 4/2004 | Koshiba et al. .......... 525/331.9 |

FOREIGN PATENT DOCUMENTS

| JP | 7-508770 A | 9/1995 |
| JP | 2002-507228 A | 3/2002 |

* cited by examiner

*Primary Examiner*—Fred Teskin
(74) *Attorney, Agent, or Firm*—Sughrue Mion, PLLC

(57) ABSTRACT

There is provided an ethylene-α-olefin-non-conjugated diene copolymer rubber satisfying the following requirements (1) to (4):

(1) a ratio of a Z-average molecular chain length (Az) measured according to a gel permeation chromatography to a number average molecular chain length (An), Az/An, of the ethylene-α-olefin-non-conjugated diene copolymer rubber is from 20 to 30, (2) a ratio of a weight average molecular chain length (Aw), which is an index of a molecular weight distribution, to the number average molecular chain length (An), Aw/An, of the ethylene-α-olefin-non-conjugated diene copolymer rubber is more than 5, (3) a unimodal or bimodal molecular weight distribution structure having a molecular chain length component, which component is present in a maximum amount in a range of 3.8<Log Aw<4.5, exists in the ethylene-α-olefin-non-conjugated diene copolymer rubber, and (4) a viscosity ($ML_{1+4}$, 121° C.) of the ethylene-α-olefin-non-conjugated diene copolymer rubber measured with a ML viscometer is more than 60 and less than 160.

12 Claims, No Drawings

COPOLYMER RUBBER, AND FOAMED ARTICLE, VULCANIZED RUBBER, PROFILE EXTRUSION MOLDED RUBBER AND HOSE FOR WATER COMPRISING SAID COPOLYMER RUBBER

FIELD OF THE INVENTION

The present invention relates to an ethylene-α-olefin-non-conjugated diene copolymer rubber; a foamed article, vulcanized rubber, profile extrusion molded rubber and a hose for water, each of which comprises said ethylene-α-olefin-non-conjugated diene copolymer rubber; a process for producing the foamed article; a process for producing the vulcanized rubber; a process for producing the profile extrusion molded rubber; and a process for producing the hose for water.

BACKGROUND OF THE INVENTION

Since an ethylene-α-olefin-non-conjugated diene copolymer rubber has excellent characteristics such as heat resistance, weatherability and ozone resistance, said copolymer rubber is used as a material for various uses such as automobiles, building materials, industrial materials and electric wires. Processing steps of said material have been rationalized, and as a result, they have been carried out in a short time because of severe cost competition.

In order to rationalize said processing steps, and as a result, carry out them in a short time, there has been proposed a conventional ethylene-α-olefin-non-conjugated diene copolymer rubber having a narrow molecular weight distribution or a low molecular weight. However, it has an unsatisfactory shape retaining property in an extrusion processing step, and as a result, it cannot make a required shape.

In order to improve a shape retaining property, there has been proposed another conventional ethylene-α-olefin-non-conjugated diene copolymer rubber having a wide molecular weight distribution to the contrary. However, it requires a long kneading time and gives an extruded material having an unsatisfactory surface because of insufficient kneading.

Accordingly, there has been needed an ethylene-α-olefin-non-conjugated diene copolymer rubber having an improved balance between kneading processability (kneadability in a short time) and a shape retaining property.

In response to said need, namely, in order to improve said balance, there has been proposed a further ethylene-α-olefin-non-conjugated diene copolymer rubber having a narrow molecular weight distribution and a special branch derived from a special diene as the fourth monomer (JP-W-2002-507228).

However, said copolymer rubber has to increase an amount of the branch in order to improve a shape retaining property, which deteriorates its kneading processability.

SUMMARY OF THE INVENTION

An object of the present invention is to provide (i) an ethylene-α-olefin-non-conjugated diene copolymer rubber having an excellent balance between kneading processability and a shape retaining property of an extruded molded article, and (ii) its uses.

The present invention is an ethylene-α-olefin-non-conjugated diene copolymer rubber satisfying the following requirements (1) to (4):

(1) a ratio of a Z-average molecular chain length (Az) measured according to a gel permeation chromatography to a number average molecular chain length (An), Az/An, of the ethylene-α-olefin-non-conjugated diene copolymer rubber is from 20 to 30, (2) a ratio of a weight average molecular chain length (Aw), which is an index of a molecular weight distribution, to the number average molecular chain length (An), Aw/An, of the ethylene-α-olefin-non-conjugated diene copolymer rubber is more than 5, (3) a unimodal or bimodal molecular weight distribution structure having a molecular chain length component, which component is present in a maximum amount in a range of 3.8<Log Aw<4.5, exists in the ethylene-α-olefin-non-conjugated diene copolymer rubber, and (4) a viscosity ($ML_{1+4}$, 121° C.) of the ethylene-α-olefin-non-conjugated diene copolymer rubber measured with a ML viscometer is more than 60 and less than 160.

The present invention is also a foamed article, vulcanized rubber, profile extrusion molded rubber or a hose for water, each of which comprises said ethylene-α-olefin-non-conjugated diene copolymer rubber.

The present invention is further a process for producing a foamed article, which comprises the step of foaming under vulcanization a composition containing:

(i) 100 parts by weight of the above-mentioned ethylene-α-olefin-non-conjugated diene copolymer rubber, (ii) from 50 to 200 parts by weight of carbon black, (iii) from 30 to 150 parts by weight of a softening agent, and (iv) from 2 to 15 parts by weight of a foaming agent.

The present invention is also a process for producing vulcanized rubber, which comprises the step of vulcanizing a composition containing:

(i) 100 parts by weight of the above-mentioned ethylene-α-olefin-non-conjugated diene copolymer rubber, (ii) from 30 to 250 parts by weight of carbon black, and (iii) from 30 to 200 parts by weight of a softening agent.

The present invention is also a process for producing profile extrusion molded rubber, which comprises the step of vulcanizing a composition containing:

(i) 100 parts by weight of the above-mentioned ethylene-α-olefin-non-conjugated diene copolymer rubber, (ii) from 30 to 250 parts by weight of carbon black, and (iii) from 30 to 200 parts by weight of a softening agent.

The present invention is also a process for producing a hose for water, which comprises the step of vulcanizing a composition containing:

(i) 100 parts by weight of the above-mentioned ethylene-α-olefin-non-conjugated diene copolymer rubber, (ii) from 30 to 250 parts by weight of carbon black, and (iii) from 30 to 200 parts by weight of a softening agent.

The ethylene-α-olefin-non-conjugated diene copolymer rubber in accordance with the present invention may be referred to as merely "copolymer rubber", hereinafter.

DETAILED DESCRIPTION OF THE INVENTION

The Z-average molecular chain length (Az), the number average molecular chain length (An) and the weight average molecular chain length (Aw) are expressed by the following formulas, respectively:

$$Az = \Sigma Mp^3 \cdot Np / \Sigma Mp^2 \cdot Np$$

$$An = \Sigma Mp \cdot Np / \Sigma Np, \text{ and}$$

$$Aw = \Sigma Mp^2 \cdot Np / \Sigma Mp \cdot Np,$$

wherein Mp is a molecular chain length of a molecular species having a polymerization degree of p in the copolymer rubber; and Np is a number of a molecule of said molecular species.

As understood from said formulas, an influence of a molecule having a high molecular weight upon An, Aw and Az becomes stronger in this order. Namely, Az reflects strongly an influence of a component having a high molecular weight contained in the copolymer rubber, and An reflects strongly an influence of a component having a low molecular weight contained therein.

The copolymer rubber satisfying the above requirements (1) and (2) contains a component having a high molecular weight and a component having a low molecular weight, wherein a content of a component having a very high molecular weight, and a content of a component having a very low molecular weight are regulated.

The copolymer rubber satisfying the above requirements (3) and (4) has a molecular weight distribution having a so-called trapezoid shape, because a molecular component present in a maximum amount in a regulated range of an ML viscosity is prescribed to a considerably high molecular weight.

As understood from the above explanation, the copolymer rubber in accordance with the present invention has a special molecular weight distribution structure, whereby the above-mentioned object of the present invention can be achieved.

When Log Aw in the requirement (3) is not more than 3.8, a kneading time is long, and when it is not less than 4.5, it is difficult to produce the copolymer rubber of the present invention.

When the viscosity in the requirement (4) is not more than 60, a balance between kneading processability and a shape retaining property cannot be obtained with ease, although kneading processability is generally almost satisfactory, and when it is not less than 160, it is difficult to produce the copolymer rubber of the present invention.

A preferable α-olefin in the present invention is that having from 3 to 20 carbon atoms. The copolymer rubber of the present invention may contain two or more kinds of α-olefin units. In the present invention, a monomer unit such as said α-olefin unit means a polymerized monomer unit such as a polymerized α-olefin unit. Specific examples of the α-olefin are linear olefins such as propylene, 1-butene, 1-pentene, 1-hexene, 1-heptnene, 1-octene, 1-nonene and 1-decene; branched olefins such as 3-methyl-1-butene, 3-methyl-1-pentene and 4-methyl-1-pentene; and vinylcyclohexane. Among them, propylene or 1-butene is preferable, and propylene is particularly preferable.

A ratio by weight of an ethylene unit to an α-olefin unit contained in the copolymer rubber is preferably from 80/20 to 45/55, and further preferably from 50/50 to 70/30. When said ratio is more than 80/20, the copolymer rubber has a poor flexibility. When said ratio is less than 45/55, it is difficult to produce a copolymer rubber having a high molecular weight to answer the object of the present invention.

Examples of the non-conjugated diene in the present invention are a linear non-conjugated diene, a cyclic non-conjugated diene and a non-conjugated polyene monomer. Specific examples thereof are 1,4-hexadiene, 1,5-hexadiene, 1,5-heptadiene, 1,6-heptadiene, 1,6-octadiene, 1,7-octadiene, 1,7-nonadiene, 1,8-nonadiene, 1,8-decadiene, 1,9-decadine, 1,12-tetradecadiene, 1,13-tetradecadiene, 3-methyl-1, 4-hexadiene, 3-methyl-1,5-hexadiene, 3-ethyl-1,4-hexadiene, 3-ethyl-1,5-hexadiene, 3,3-dimethyl-1,4-hexadiene, 3,3-dimethyl-1,5-hexadiene, dicyclopentadiene, 5-ethylidene-2-norbornene, 5-vinyl-2-norbornene, 2,5-norbornadiene, 7-methyl-2,5-norbornadiene, 7-ethyl-2,5-norbornadiene, 7-propyl-2,5-norbornadiene, 7-butyl-2,5-norbornadiene, 7-pentyl-2,5-norbornadiene, 7-hexyl-2,5-norbornadiene, 7,7 dimethyl-2,5-norbornadiene, 7,7-methylethyl-2,5-norbornadiene, 7-chloro-2,5-norbornadiene, 7-bromo-2,5-norbornadiene, 7-fluoro-2,5-norbornadiene, 7,7-dichloro-2,5-norbornadiene, 1-methyl-2, 5-norbornadiene, 1-ethyl-2,5-norbornadiene, 1-propyl-2,5-norbornadiene, 1-butyl-2,5-norbornadiene, 1-chloro-2,5-norbornadiene and 1-bromo-2,5-norbornadiene. Further, the cyclic dienes having the following structures can be also exemplified.

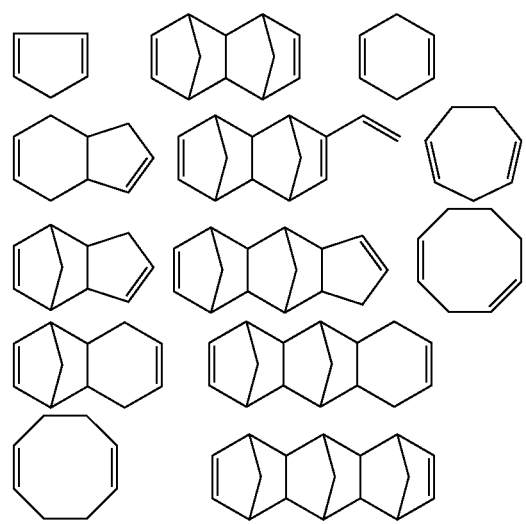

Among them, 5-ethylidene-2-norbornene or a combination thereof with dicyclopentadiene, 5-vinyl-2-norbornene or norbornadiene is particularly preferable.

A content of a non-conjugated diene unit contained in the copolymer rubber is preferably from 5 to 35, particularly preferably from 10 to 30, and further preferably from 12 to 25 in an iodine value. When said content is less than 5, a vulcanization density of a vulcanized copolymer rubber may be low. When said content is more than 35, heat resistance of the copolymer rubber deteriorates, and also too much use of expensive non-conjugated diene is not economical.

When a combination of 5-ethylidene-2-norbornene with dicyclopentadiene, 5-vinyl-2-norbornene or norbornadiene is used, a molar ratio of the former to the latter is less than 3/1, and further preferably less than 5/1. When said molar ratio is not less than 5/1, the above-mentioned requirements (1) to (4) are not satisfied with ease.

A ratio of Az to a residual compressive stress ratio, Az/residual compressive stress ratio, is preferably not more than 2700, wherein the "residual compressive stress ratio" is measured by a method comprising the steps of (i) compressing the copolymer rubber at 80° C. by 50%, (ii) after 0.01 second, measuring its stress ($S_{0.01}$), (iii) after 100 seconds, measuring its stress ($S_{100}$), and (iV) calculating a formula, residual compressive stress ratio=$S_{100}/S_{0.01}$. When said ratio is more than 2700, a kneading time is too long.

The copolymer rubber of the present invention can be produced by polymerizing ethylene, an α-olefin and a non-conjugated diene with a polymerization catalyst such as a Ziegler-Natta catalyst and a metallocene catalyst known in the art.

A preferable Ziegler-Natta catalyst is a combination of an arganoaluminum compound with a vanadium compound. Examples of the arganoaluminum compound are triethylaluminum, diethylaluminum chloride, ethylaluminum sesquichloride, isobutylaluminum sesquichloride, ethylaluminum dichloride, isobutylaluminum dichloride, and a combination thereof.

Examples of the vanadium compound are a vanadium tetrahalide, a vanadium oxyhalide, vanadium triacetylacetonate, vanadium oxydiacetylacetonate, a vanadium oxytrialkoxide, a halogenated vanadium oxyalkoxide, and a combination thereof. Each of the arganoaluminum compound and the vanadium compound can be combined with an alcohol such as methanol and ethanol. Hydrogen can be used as a chain transfer agent.

Examples of the metallocene catalyst are those disclosed in, for example, JP 58-19309A (corresponding to U.S. Pat. No. 4,542,199A), JP 60-35005A (corresponding to U.S. Pat. No. 4,536,484A), JP 60-35006A (corresponding to U.S. Pat. No. 4,937,299A), JP 60-35007A (corresponding to U.S. Pat. No. 5,324,800A), JP 60-35008A (corresponding to U.S. Pat. No. 4,530,914A), JP 61-130314A (corresponding to U.S. Pat. No. 4,769,510A), JP 3-163088A (corresponding to U.S. Pat. No. 5,703,187A), JP 4-268307A (corresponding to U.S. Pat. No. 5,243,001A), JP 9-12790A (corresponding to EP 751182A), JP 9-87313A (corresponding to U.S. Pat. No. 6,329,478A), JP 11-193309A (corresponding to U.S. Pat. No. 6,084,048A), JP 11-80233A (corresponding to U.S. Pat. No. 6,121,401A) and JP 10-508055W (corresponding to U.S. Pat. No. 9,860,29A).

A specific example of the metallocene catalyst is that obtained using a transition metal complex containing at least one cyclopentadienyl skeleton.

The most suitable catalyst is that obtained using the following transition metal complex (A) and an aluminum compound (B) and/or a boron compound (C)

Transition Metal Complex (A)

A transition metal complex represented by the following formula [I], [II] or [III].

In the above formulas [I] to [III], $M^1$ is a transition metal atom belonging to the group 4 of the periodic table; A is an atom belonging to the group 16 of the periodic table; J is an atom belonging to the group 14 of the periodic table; $Cp^1$ is a group having a cyclopentadiene type anion skeleton; $X^1$, $X^2$, $R^1$, $R^2$, $R^3$, $R^4$, $R^5$ and $R^6$ are independently of one another a hydrogen atom, a halogen atom, an alkyl group, an aralkyl group, an aryl group, a substituted silyl group, an alkoxy group, an aralkyloxy group, an aryloxy group or a di-substituted amino group; and $X^3$ is an atom belonging to the group 16 of the periodic table, wherein $R^1$, $R^2$, $R^3$, $R^4$, $R^5$ and $R^6$ may be optionally combined to form a ring; and two of $M^1$, A, J, $Cp^1$, $X^1$, $X^2$, $R^1$, $R^2$, $R^3$, $R_4$, $R^5$ and $R^6$ are the same or different.

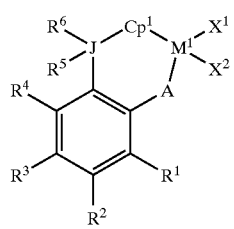

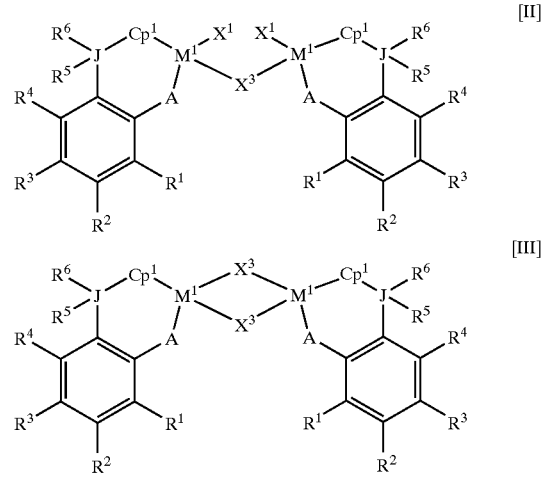

Aluminum Compound (B)

An aluminum compound expressed by the following (B1) (B2) or (B3):

(B1) an organoaluminum compound represented by a formula, $E^1{}_a AlZ_{3-a}$, (B2) a cyclic aluminoxane having a structure represented by a formula, $\{-Al(E^2)-O-\}_b$, and (B3) a linear aluminoxane having a structure represented by a formula, $\{-Al(E^3)-O-\}_c AlE^3{}_2$.

In the above, $E^1$, $E^2$ and $E^3$ are each a hydrocarbon group; all $E^1$, all $E^2$ and all $E^3$ are the same or different; Z is a hydrogen atom or a halogen atom; all Z are the same or different; a is a number satisfying $0<a\leq 3$; b is an integer of not less than 2; and c is an integer of not less than 1.

Boron Compound (C)

A boron compound expressed by the following (C1), (C2) or (C3):

(C1) a boron compound represented by a formula, $BQ^1Q^2Q^3$, (C2) a boron compound represented by a formula, $G^+(BQ^1Q^2Q^3Q^4)^-$, and (C3) a boron compound represented by a formula, $(L-H)^+(BQ^1Q^2Q^3Q^4)^-$.

In the above, B is a trivalent boron atom; $Q^1$ to $Q^4$ are each a halogen atom, a hydrocarbon group, a halogenated hydrocarbon group, a substituted silyl group, an alkoxy group or a di-substituted amino group and are the same or different; $G^+$ is an inorganic or organic cation; L is a neutral Lewis base; and $(L-H)^+$ is a Bronsted acid.

When using a catalyst obtained by combining the component (A) with the component (B), it is preferable to use the component (B2) and/or the component (B3) as the component (B). When using a catalyst obtained by combining the component (A), the component (B) and the component (C), the component (B1) is easily used as the component (B).

A molar ratio of the component (B)/the component (A) is usually from 0.1 to 10,000, and preferably from 5 to 2,000, and a molar ratio of the component (C)/the component (A) is usually from 0.01 to 100, and preferably from 0.5 to 10.

When the components (A) to (C) are used in a solution or a suspension, each concentration thereof maybe suitably selected depending upon conditions such as performance of an apparatus used for supplying respective components to a polymerization reactor. A concentration of the component (A) is usually from 0.01 to 500 µmol/g, preferably from 0.05 to 100 µmol/g, and more preferably from 0.05 to 50 µmol/g. A concentration of the component (B) is usually from 0.01 to 10000 µmol/g, preferably from 0.1 to 5000 µmol/g, and more preferably from 0.1 to 2,000 µmol/g in an Al atom concentration. A concentration of the component (C) is usually from 0.01 to 500 µmol/g, preferably from 0.05 to 200 µmol/g, and more preferably from 0.05 to 100 µmol/g.

Examples of a method for producing the copolymer rubber of the present invention are (i) a solution polymerization method using, as a solvent, an aliphatic hydrocarbon such as butane, pentane, hexane, heptane and octane; an aromatic hydrocarbon such as benzene and toluene; and a halogenated hydrocarbon such as methylene dichloride, (ii) a slurry polymerization method using the above solvents, and (iii) a gas phase polymerization method carried out in a gaseous monomer. These methods may be either continuous polymerization methods or batch-wise polymerization methods.

Polymerization temperature is usually from −50 to 250° C., and particularly preferably from −20 to 200° C. Polymerization pressure is preferably from atmospheric pressure to 100 kg/cm$^2$G. A polymerization time can generally be suitably determined depending upon a catalyst used and a reaction apparatus, and is usually from 1 minute to 20 hours. It is possible to use a chain transfer agent such as hydrogen to regulate a molecular weight of the obtained copolymer rubber.

A preferable polymerization method is a continuous or batch-wise solution polymerization method using an aliphatic hydrocarbon such as hexane, heptane and octane as a solvent. Although the copolymer rubber of the present invention can substantially be produced using only one reactor, two or more reactors connected in series or in parallel may be used. Preferable specific polymerization conditions are the following (1) to (4):

a polymerization method is a solution polymerization method, (2) polymerization temperature is from 0 to 200° C., (3) a retention time, namely, a polymerization time, is from 5 to 120 minutes, and (4) pressure in a polymerization reactor is from atmospheric pressure to 100 kg/cm$^2$G.

A more preferable polymerization method is that carried out under conditions of from 30 to 160° C. and from 0 to 50 kg/cm$^2$G using a solvent such as hexane in a reactor for copolymerizing in a solution under low temperature and low pressure, whereby the copolymer rubber dissolved in the solvent is produced effectively.

An exemplified process for producing the copolymer rubber of the present invention using at least two reactors connected in series comprises the steps of:

(1) producing a component in the first reactor in the presence or absence of hydrogen, which component has (i) a ratio, Aw/An, of from 2 to 4, and (ii) a unimodal molecular weight distribution structure having a molecular chain length component present in a maximum amount in a range of 3.8<Log Aw<4.5, and (2) producing another component in the succeeding reactor(s) in the presence of the component obtained in the first step and preferably also in the presence of hydrogen, which component has (i) a ratio, Aw/An, of from 2 to 4, and (ii) a unimodal molecular weight distribution structure having a molecular chain length component present in a maximum amount in a range of 2.5<Log Aw<3.5.

Preferable polymerization temperature in the first reactor is from 30 to 47° C. and a preferable copolymer rubber concentration of its solution in the first reactor is from 3 to 15% by weight. Preferable polymerization temperature in the succeeding reactor(s) is from 40 to 65° C. and a preferable copolymer rubber concentration of its solution in the succeeding reactor(s) is from 3 to 15% by weight.

A further exemplified process for producing the copolymer rubber of the present invention uses at least two reactors connected in parallel, wherein copolymer rubber solutions produced in respective reactors and having similar structures to those mentioned above are blended.

The copolymer rubber of the present invention is used particularly preferably in order to produce a foamed article, vulcanized rubber, profile extrusion molded rubber and a hose for water.

Examples of carbon black used for production thereof are HAF carbon, FEF carbon, high structure FEF carbon, GPF carbon, SRF carbon, high structure SRF carbon and MAF carbon, and a combination thereof.

A preferable softening agent for production thereof is paraffin oil, and hydrogenated paraffin oil can also be used.

A method for producing the foamed article comprising the copolymer rubber of the present invention may be a method known in the art.

When producing the foamed article, carbon black is blended in an amount of preferably from 50 to 200 parts by weight, and further preferably from 80 to 150 parts by weight per 100 parts by weight of the copolymer rubber. When said amount is more than 200 parts by weight, a foamed article having a sufficiently low density cannot be obtained, and when said amount is less than 50, the obtained extrusion molded article has a wave-like appearance on its surface.

When producing the foamed article, the softening agent is blended in an amount of preferably from 30 to 150 parts by weight, and further preferably from 50 to 100 parts by weight per 100 parts by weight of the copolymer rubber. When said amount is more than 150 parts by weight, a foamed article having a sufficiently low density may not be obtained because of easy gas leak, and when said amount is less than 30, a foamed article having a sufficiently low density may not be obtained because of a too high viscosity of the blend.

When producing the foamed article, the foaming agent is blended in an amount of preferably from 2 to 15 parts by weight, and further preferably from 3 to 7 parts by weight per 100 parts by weight of the copolymer rubber. When said amount is more than 15 parts by weight, a foamed article having a sufficiently low density nay not be obtained because of easy gas leak, and when said amount is less than 2, a foamed article having a sufficiently low density may not be obtained because of an insufficient amount of gas generated from the foaming agent.

Examples of the foaming agent are an inorganic foaming agent such as sodium hydrogen carbonate and ammonium hydrogen carbonate; and an organic foaming agent such as N,N'-dinitroso-pentamethylene-tetramine, azodicarbonamide, benzenesulfonyl hydrazide and p,p'-oxybis(benzenesulfonyl hydrazide). Among them, p,p'-oxybis(benzenesulfonyl hydrazide), azodicarbonamide or their combination is preferable.

When producing the foamed article, there can be blended components generally used in a rubber blend technology such as various fillers, processing co-agents, vulcanizing agents, vulcanization accelerators and dehydrating agents.

A method for producing the vulcanized rubber from the copolymer rubber of the present invention may be a method known in the art.

When producing the vulcanized rubber, the softening agent is blended in an amount of preferably from 30 to 200 parts by weight, and further preferably from 50 to 100 parts by weight per 100 parts by weight of the copolymer rubber. When said amount is more than 200 parts by weight, a resultant blend has strong adhesiveness, and as a result, workability may deteriorate, and when said amount is less than 30, a resultant blend has too high viscosity, and as a result, scorch may happen in a kneading step.

When producing the vulcanized rubber, there can be blended components generally used in a rubber blend technology such as various fillers, processing co-agents and dehydrating agents.

A method for producing the profile extrusion molded rubber from the copolymer rubber of the present invention may be a method known in the art.

When producing the profile extrusion molded rubber, carbon black is blended in an amount of preferably from 30 to 250 parts by weight, and further preferably from 80 to 150 parts by weight per 100 parts by weight of the copolymer rubber. When said amount is more than 250 parts by weight, a profile extrusion molded rubber having a sufficient strength cannot be obtained, and when said amount is less than 30, the obtained profile extrusion molded rubber has a wave-like appearance on its surface.

When producing the profile extrusion molded rubber, the softening agent is blended in an amount of preferably from 30 to 200 parts by weight, and further preferably from 50 to 100 parts by weight per 100 parts by weight of the copolymer rubber. When said amount is more than 200 parts by weight, a resultant blend has strong adhesiveness, and as a result, workability may deteriorate, and when said amount is less than 30, a resultant blend has too high viscosity, and as a result, scorch may happen in a kneading step.

When producing the profile extrusion molded rubber, there can be blended components generally used in a rubber blend technology such as various fillers, processing co-agents, vulcanizing agents, vulcanization accelerators and dehydrating agents.

Examples of the profile extrusion molded rubber are various weather strips for auto mobiles, gaskets for building, and gaskets for containers.

A method for producing the hose for water from the copolymer rubber of the present invention may be a method known in the art.

When producing the hose for water, carbon black is blended in an amount of preferably from 30 to 250 parts by weight, and further preferably from 80 to 150 parts by weight per 100 parts by weight of the copolymer rubber. When said amount is more than 250 parts by weight, a hose for water having a sufficient strength cannot be obtained, and when said amount is less than 30, the obtained extrusion molded article has a wave-like appearance on its surface.

When producing the hose for water, the softening agent is blended in an amount of preferably from 30 to 200 parts by weight, and further preferably from 50 to 100 parts by weight per 100 parts by weight of the copolymer rubber. When said amount is more than 200 parts by weight, a resultant blend has strong adhesiveness, and as a result, workability may deteriorate, and when said amount is less than 30, a resultant blend has too high viscosity, and as a result, scorch may happen in a kneading step.

When producing the hose for water, there can be blended components generally used in a rubber blend technology such as various fillers, processing co-agents, vulcanizing agents, vulcanization accelerators and dehydrating agents.

Examples of the hose for water are radiator hoses for automobiles or motorcycles, heater hoses, radiator hoses for generators, and hoses for various heat exchangers.

EXAMPLE

The present invention is explained with reference to Examples, which are not intended to limit the scope of the present invention.

Example 1

Production of Copolymer Rubber-1 in Accordance with the Present Invention

Using two 100 litter-volume SUS polymerization reactors equipped with a stirrer, which were connected in series, hexane as a solvent; ethylene, propylene and 5-ethylidene-2-norbornene as monomers; and vanadium oxytrichloride and ethylaluminum sesquichloride as catalysts were fed continuously to a lower part of the first polymerization reactor at 118 kg/hour, 3.54 kg/hour, 12.03 kg/hour, 0.58 kg/hour, 0.0063 kg/hour and 0.032 kg/hour, respectively. Those monomers were polymerized at 47° C. using hydrogen as a molecular weight regulator under supplying low pressure steam into a jacket equipped outside the polymerization reactor. A polymerization liquid drawn continuously from an upper part of the first polymerization reactor was fed to a lower part of the second polymerization reactor, under keeping 100 liter of the polymerization liquid contained in the first polymerization reactor.

Hexane as a solvent; ethylene and 5-ethylidene-2-norbornene as monomers; and vanadium oxytrichloride and ethylaluminum sesquichloride as catalysts were fed continuously to a lower part of the second polymerization reactor at 79 kg/hour, 1.0 kg/hour, 0.436 kg/hour, 0.029 kg/hour and 0.086 kg/hour, respectively. Those monomers were polymerized at 60° C. using hydrogen as a molecular weight regulator under supplying low pressure steam into a jacket equipped outside the polymerization reactor.

A small amount of ethanol was added to a polymerization liquid drawn from the second polymerization reactor to terminate a polymerization reaction. Then, monomers remaining non-polymerized were removed, and washing with water was carried out. And then, the solvent was removed with steam in a large amount of water, thereby taking out a copolymer rubber. Said copolymer rubber was dried overnight at 80° C. under vacuum to obtain an ethylene-propylene-5-ethylidene-2-norbornene copolymer rubber (copolymer rubber-1) at a production rate of 6.5 kg/hour.

Example 2

Production of Copolymer Rubber-2 in Accordance with the Present Invention

Example 1 was repeated to obtain an ethylene-propylene-5-ethylidene-2-norbornene copolymer rubber (copolymer rubber-2) at a production rate of 6.5 kg/hour, except that (1) feeding rates to the first and second polymerization reactors of 5-ethylidene-2-norbornene were changed to 0.606 kg/hour and 0.422 kg/hour, respectively, (2) those of vanadium oxytrichloride were changed to 0.0052 kg/hour and 0.023 kg/hour, respectively, (3) those of ethylaluminum sesquichloride were changed to 0.026 kg/hour and 0.071 kg/hour, respectively, (4) temperature of the first polymerization reactor was changed to 45° C., and (5) that of the second polymerization reactor was changed to 57° C.

Example 3

Production of Copolymer Rubber-3 in Accordance with the Present Invention

Using two 100 litter-volume SUS polymerization reactors equipped with a stirrer, which were connected in series, hexane as a solvent; ethylene, propylene, 5-ethylidene-2-norbornene and dicyclopentadiene as monomers; and vanadium oxytrichloride and ethylaluminum sesquichloride as catalysts were fed continuously to a lower part of the first polymerization reactor at 118 kg/hour, 3.52 kg/hour, 11.96 kg/hour, 0.80 kg/hour, 0.09 kg/hour, 0.0067 kg/hour, and 0.033 kg/our, respectively. Those monomers were polymerized at 47° C. using hydrogen as a molecular weight regulator. A polymerization liquid drawn continuously from an upper part of the first polymerization reactor was fed to a lower part of the second polymerization reactor, under keeping 100 liter of the polymerization liquid contained in the first polymerization reactor.

Hexane as a solvent; ethylene, 5-ethylidene-2-norbornene and dicyclopentadiene as monomers; and vanadium oxytrichloride and ethylaluminum sesquichloride as catalysts were fed continuously to a lower part of the second polymerization reactor at 79 kg/hour, 1.0 kg/hour, 0.39 kg/hour, 0.04 kg/hour, 0.024 kg/hour and 0.072 kg/hour, respectively. Those monomers were polymerized at 57° C. using hydrogen as a molecular weight regulator.

A small amount of ethanol was added to a polymerization liquid drawn from the second polymerization reactor to terminate a polymerization reaction. Then, monomers remaining non-polymerized were removed, and washing with water was carried out. And then, the solvent was removed with steam in a large amount of water, thereby taking out a copolymer rubber. Said copolymer rubber was dried overnight at 80° C. under vacuum to obtain an ethylene-propylene-5-ethylidene-2-norbornene-dicyclopentadiene copolymer rubber (copolymer rubber-3) at a production rate of 6.4 kg/hour.

Example 4

Production of Copolymer Rubber-4 in Accordance with the Present Invention

Example 3 was repeated to obtain an ethylene-propylene-5-ethylidene-2-norbornene-dicyclopentadiene copolymer rubber (copolymer rubber-4) at a production rate of 6.6 kg/hour, except that (1) feeding rates to the first and second polymerization reactors of 5-ethylidene-2-norbornene were changed to 0.51 kg/hour and 0.34 kg/hour, respectively, (2) those of dicyclopentadiene were changed to 0.10 kg/hour and 0.05 kg/hour, respectively, (3) those of vanadium oxytrichloride were changed to 0.0071 kg/hour and 0.026 kg/hour, respectively, (4) those of ethylaluminum sesquichloride were changed to 0.036 kg/hour and 0.079 kg/hour, respectively, (5) temperature of the first polymerization reactor was changed to 47° C., and (6) that of the second polymerization reactor was changed to 60° C.

Comparative Example 1

Production of Copolymer Rubber-5 Outside the Scope of the Present Invention Using two 100 litter-volume SUS polymerization reactors equipped with a stirrer, which were connected in series, hexane as a solvent; ethylene, propylene and 5-ethylidene-2-norbornene as monomers; and vanadium oxytrichloride and ethylaluminum sesquichloride as catalysts were fed continuously to a lower part of the first polymerization reactor at 108 kg/hour, 2.37 kg/hour, 13.00 kg/hour, 0.40 kg/hour, 0.0035 kg/hour and 0.028 kg/hour, respectively, and those monomers were polymerized at 50° C. A polymerization liquid drawn continuously from an upper part of the first polymerization reactor was fed to a lower part of the second polymerization reactor, under keeping 100 liter of the polymerization liquid contained in the first polymerization reactor.

Hexane as a solvent; ethylene and 5-ethylidene-2-norbornene as monomers; and vanadium oxytrichloride and ethylaluminum sesquichloride as catalysts were fed continuously to a lower part of the second polymerization reactor at 98 kg/hour, 0.9 kg/hour, 0.358 kg/hour, 0.011 kg/hour and 0.057 kg/hour, respectively. Those monomers were polymerized at 55° C. using hydrogen as a molecular weight regulator under supplying low pressure steam into a jacket equipped outside the polymerization reactor.

A small amount of ethanol was added to a polymerization liquid drawn from the second polymerization reactor to terminate a polymerization reaction. Then, monomers remaining non-polymerized were removed, and washing with water was carried out. And then, the solvent was removed with steam in a large amount of water, thereby taking out a copolymer rubber. Said copolymer rubber was dried overnight at 80° C. under vacuum to obtain an ethylene-propylene-5-ethylidene-2-norbornene copolymer rubber (copolymer rubber-5) at a production rate of 4.3 kg/hour.

Comparative Example 2

Production of Copolymer Rubber-6 Outside the Scope of the Present Invention Comparative Example 1 was repeated to obtain an ethylene-propylene-5-ethylidene-2-norbornene copolymer rubber (copolymer rubber-6) at a production rate of 5.9 kg/hour, except that (1) feeding rates to the first polymerization reactor of hexane, ethylene, propylene, 5-ethylidene-2-norbornene, vanadium oxytrichloride and ethylaluminum sesquichloride were changed to 13 kg/hour, 3.56 kg/hour, 17.0 kg/hour, 0.52 kg/hour, 0.0050 kg/hour and 0.040 kg/hour, respectively, (2) feeding rates to the second polymerization reactor of hexane, ethylene, 5-ethylidene-2-norbornene, vanadium oxytrichloride and ethylaluminum sesquichloride were changed to 98 kg/hour, 1.29 kg/hour, 0.46 kg/hour, 0.016 kg/hour and 0.081 kg/hour, respectively, (3) temperature of the first polymerization reactor was changed to 53° C., and (5) that of the second polymerization reactor was changed to 58° C.

Properties of the above-mentioned copolymer rubbers, and copolymer rubber-7 (Comparative Example 3) having a trade name of ESPRENE E-5216 manufactured by Sumitomo Chemical Co., Ltd., which is outside the scope of the present invention, were measured according to the following methods, and results thereof are summarized in Table 1.

1. Content of Propylene Unit (% by Weight)

It was measured by a method comprising the steps of:

(1) making about 0.1 mm-thick film of the above-mentioned copolymer rubber-1 to copolymer rubber-7, and three kinds of standard reference polymers of polypropylene, polyethylene and an ethylene-propylene copolymer (ethylene unit content=50% by weight, and propylene unit content=50% by weight), respectively, using a hot-press machine, (2) measuring an infrared adsorption spectrum of each film three times with an infrared spectrometer (IR-810 manufactured by JASCO Corporation), (3) obtaining transmittance of an adsorption peak at 1155 $cm^{-1}$ (methyl branch) of each infrared adsorption spectrum according to Takayama and Usami et al, "Characterization of Polyethylene by Infrared Adsorption Spectrum", or Mc Rae, M. A. and Madams, W. F. et al, "Die Makromolekulare Chemie, 177, 461 (1976)", (4) averaging three values, and assigning the average value to a measured value, and (5) comparing respective measured values of copolymer rubber-1 to copolymer rubber-7 with those of standard reference polymers to obtain a content of propylene unit thereof.

2. Iodine Value

It was measured by a method comprising the steps of:

(1) making a 0.5 mm-thick film of the above-mentioned copolymer rubber-1 to copolymer rubber-7 using a hot-press machine, (2) measuring an infrared adsorption spectrum of each film with the above-mentioned infrared spectrometer, (3) obtaining transmittance of a peak at 1611 $cm^{-1}$ derived from a dicyclopentadiene unit, and that of a peak at 1688 $cm^{-1}$ derived from a 5-ethylidene-2-norbornene unit of said infrared adsorption spectrum, respectively, (4) calculating a molar content of a double bond contained in respective copolymer rubbers from said transmittance, and (5) converting said molar content to an iodine value.

3. Molecular Weight and Molecular Weight Distribution

Using a solution of about 5 mg of the copolymer rubber in 5 ml of o-dichlorobenzene, it was measured according to a gel permeation chromatography (GPC) under conditions as mentioned:

(1) an apparatus, a trademark of 150C/GPC, manufactured by Waters Co., was used as a GPC apparatus, (2) a column, a trademark of SODEX PACKED COLUMN A-80M, manufactured by Showa Denko K.K. was used as a column, (3) 400 micro-litters of the above-mentioned solution was injected, (4) an elution temperature was adjusted to 140° C., (5) a flow rate of the solution eluted was controlled to 1.0 ml/min, (6) a refractivity detector was used as a detector, (7) polystyrene having molecular weights between 68–8,400,000, manufactured by Tosoh Corporation was used as a molecular weight standard reference material, and (8) a weight average molecular chain length (Aw), a number average molecular chain length (An) and a Z-average molecular chain length (Az) of the copolymer rubber were obtained as values converted to the molecular chain length of the above-mentioned polystyrene, and then, Az/An and Aw/AN were obtained.

4. Stress Relaxation Rate

It was measured by a method comprising the steps of:

(1) press molding the copolymer rubber to obtain a 4 mm-thick molded article, (2) stamping out said article with a punch having a 7 mm diameter to make a sample for measurement, and (3) measuring under the following conditions:

(i) a full automatic apparatus for measuring stress relaxation manufactured by Island Kogyo K.K. was used, (ii) temperature of the sample was 80° C., (iii) a measuring mode was a compression mode, and (iv) 50% strain was given to the sample, and stress after 0.01 second, and that of after 100 seconds were measured, respectively.

Kneading processability was investigated by kneading components shown in Table 2 (parts by weight) in a 0.6 liter-volume mixer, BR-600, manufactured by Toyo Seiki Co., Ltd., and measuring BIT (Black Incorporation Time), which is a time from dropping a ram to appearance of a peak in a dispersion process, under conditions of ram pressure of 2 $kg/cm^2$, a rotor speed of 50 rpm, circulated oil temperature of 80° C., and a mastication time of 30 seconds. Specific examples of BIT can be found in, for example, "Rubber Testing Methods <new edition>", 2nd edition, Japan Rubber Society, page 176.

TABLE 1

| | Copolymer rubber | | | | | | |
|---|---|---|---|---|---|---|---|
| | 1 | 2 | 3 | 4 | 5 | 6 | 7 |
| $ML_{1+4}$, 121° C. | 88 | 86 | 83 | 82 | 83 | 82 | 80 |
| Propylene unit content(wt %) | 43 | 43 | 43 | 42 | 42 | 40 | 42 |
| Iodine value (ENB)*1 | 21 | 21 | 21 | 22 | 21 | 20 | 21 |
| Iodine value (DCPD)*1 | — | — | 0.8 | 2 | — | — | — |
| An | 2164 | 1888 | 2080 | 1939 | 3174 | 2820 | 2209 |
| Aw | 13613 | 12722 | 13343 | 13087 | 11258 | 13650 | 14103 |
| Az | 49845 | 23748 | 48973 | 50018 | 37813 | 55908 | 63717 |
| Az/An | 23.0 | 23.2 | 23.5 | 25.8 | 11.9 | 19.8 | 28.8 |
| Aw/An | 6.3 | 608 | 6.4 | 6.8 | 3.6 | 4.8 | 6.4 |
| Log Aw | 3.89 | 4.06 | 3.83 | 3.78 | 3.70 | 3.66 | 3.55 |
| Residual stress ratio (%)*3 | 19.4 | 17.6 | 19.5 | 23.0 | 11.2 | 14.6 | 22.0 |
| Az/residual stress ratio*3 | 2569 | 2486 | 2511 | 2175 | 3376 | 3829 | 2896 |

*1ENB: 5-ethylidene-2-norbornene
*2DCPD: dicyclopentadiene
*3 100 × (stress after 100 seconds)/(stress after 0.01 second)

TABLE 2

|  | Example | | | | Comparative Example | | |
| --- | --- | --- | --- | --- | --- | --- | --- |
|  | 1 | 2 | 3 | 4 | 1 | 2 | 3 |
| Copolymer rubber-1 | 100 | — | — | — | — | — | — |
| Copolymer rubber-2 | — | 100 | — | — | — | — | — |
| Copolymer rubber-3 | — | — | 100 | — | — | — | — |
| Copolymer rubber-4 | — | — | — | 100 | — | — | — |
| Copolymer rubber-5 | — | — | — | — | 100 | — | — |
| Copolymer rubber-6 | — | — | — | — | — | 100 | — |
| Copolymer rubber-7 | — | — | — | — | — | — | 100 |
| Stearic acid | 1 | 1 | 1 | 1 | 1 | 1 | 1 |
| Zinc oxide | 5 | 5 | 5 | 5 | 5 | 5 | 5 |
| GPF carbon | 100 | 100 | 100 | 100 | 100 | 100 | 100 |
| Paraffin oil | 10 | 10 | 10 | 10 | 10 | 10 | 10 |
| Heavy calcium carbonate | 40 | 40 | 40 | 40 | 40 | 40 | 40 |
| Calcium oxide | 5 | 5 | 5 | 5 | 5 | 5 | 5 |
| BIT (sec) | 82 | 84 | 76 | 80 | 94 | 98 | 104 |

From the above, it can be understood that the copolymer rubber of the present invention has an excellent balance between BIT, which is an index of kneading processability, and a residual compression stress ratio, which is an index of a shape retaining property.

Examples 5–8, and Comparative Examples 4–6

1. Production of Compositions

Components between the copolymer rubber-1 and the processing co-agent (2) shown in Table 3 (part by weight) were kneaded for 5 minutes at 60 rpm in a 1.7 liter-volume Banbury type mixer, BB-2 MIXER, manufactured by Kobe Steel, Ltd. After cooling the obtained kneaded product to room temperature, the kneaded product was wounded around a 10 inch-open roll regulated at 40° C., and then, components between calcium oxide and OBSH shown therein were mixed to obtain respective compositions.

Here, GPF carbon was Asahi 55G manufactured by Asahi Carbon Co., Ltd.; paraffin oil was DIANA PS-430 manufactured by Idemitsu Kosan Co., Ltd.; heavy calcium carbonate was NS-200 manufactured by Nitto Funka Kogyo K.K.; compound zinc oxide was META Z102 manufactured by Inoue Sekkai kougyou Co.; PEG #4000 was polyethylene glycol having an average molecular weight of 4000; the processing co-agent (1) was STRUCTOL WB42 manufactured by Schill & Seilacher Co.; the processing co-agent (2) was AKTIPLAST manufactured by Bayer; calcium oxide was VESTA PP manufactured by Inoue Sekkai kougyou Co.; ETU-80 as a vulcanization accelerator was an ethylene thiourea master batch manufactured by Rhein Chemie Co.; MBTS-75 as a vulcanization accelerator was dibenzothiazyl disulfide master batch manufactured by Rhein Chemie; MBT-80 as a vulcanization accelerator was 2-mercaptobezothiazole master batch manufactured by Rhein Chemie Co.; DPTT-80 as a vulcanization accelerator was dipentamethylenethiuram tetrasulfide master batch manufactured by Rhein Chemie Co.; ZAT-70 as a vulcanization accelerator was a zinc-amine-dithiophosphate complex manufactured by Rhein Chemie Co.; and OBSH as a vulcanization accelerator was p,p'-oxybis(benzenesulfonyl hydrazide) (NEO-SELLBORN #1000, manufactured by Eiwa Chemical Ind. Co., Ltd.).

2. Vulcanization and Foaming

The above-mentioned respective compositions were extruded with a 45 mm φ extruder (L/D=16) to obtain respective cylindrical articles. The respective articles were introduced continuously into a hot air vulcanizing vessel regulated at 230° C., and heated therein for 5 minutes to obtain respective vulcanized and foamed articles.

3. Properties of Foamed Articles

They were measured by the following methods. Results are shown in Table 4.

(1) Density

It was measured by a water displacement method.

(2) Tensile Property

A sample obtained by stamping out the above-mentioned foamed article with a JIS No. 3 dumbbell was used for a tensile test at a tensile rate of 500 mm/minute.

(3) Compressive Permanent Strain

It was measured by a method comprising the steps of:
  (i) compressing the foamed article having original height of $H_0$ to 50% height thereof,
  (ii) heating at 70° C. for 22 hours under said compression,
  (iii) releasing the compression,
  (iv) measuring its height (H), and
  (v) calculating the following formula:

compressive permanent strain (%)=50×($H_0$–$H$)/$H_0$.

TABLE 3

|  | Example | | | | Comparative Example | | |
| --- | --- | --- | --- | --- | --- | --- | --- |
|  | 5 | 6 | 7 | 8 | 4 | 5 | 6 |
| Copolymer rubber-1 | 100 | — | — | — | — | — | — |
| Copolymer rubber-2 | — | 100 | — | — | — | — | — |
| Copolymer rubber-3 | — | — | 100 | — | — | — | — |
| Copolymer rubber-4 | — | — | — | 100 | — | — | — |
| Copolymer rubber-5 | — | — | — | — | 100 | — | — |
| Copolymer rubber-6 | — | — | — | — | — | 100 | — |
| Copolymer rubber-7 | — | — | — | — | — | — | 100 |
| Stearic acid | 1 | 1 | 1 | 1 | 1 | 1 | 1 |
| Compound zinc oxide | 5 | 5 | 5 | 5 | 5 | 5 | 5 |
| GPF carbon | 110 | 110 | 110 | 110 | 110 | 110 | 110 |
| Paraffin oil | 63 | 63 | 63 | 63 | 63 | 63 | 63 |
| Heavy calcium carbonate | 20 | 20 | 20 | 20 | 20 | 20 | 20 |
| PEG #4000 | 1 | 1 | 1 | 1 | 1 | 1 | 1 |
| Processing co-agent (1) | 2 | 2 | 2 | 2 | 2 | 2 | 2 |
| Processing co-agent (2) | 2 | 2 | 2 | 2 | 2 | 2 | 2 |

TABLE 3-continued

|  | Example | | | | Comparative Example | | |
| --- | --- | --- | --- | --- | --- | --- | --- |
|  | 5 | 6 | 7 | 8 | 4 | 5 | 6 |
| Calcium oxide | 5 | 5 | 5 | 5 | 5 | 5 | 5 |
| Sulfur (curing agent) | 1.5 | 1.5 | 1.5 | 1.5 | 1.5 | 1.5 | 1.5 |
| ETU-80 | 0.63 | 0.63 | 0.63 | 0.63 | 0.63 | 0.63 | 0.63 |
| MBTS-75 | 0.53 | 0.53 | 0.53 | 0.53 | 0.53 | 0.53 | 0.53 |
| MBT-80 | 1.0 | 1.0 | 1.0 | 1.0 | 1.0 | 1.0 | 1.0 |
| DPTT-80 | 0.63 | 0.63 | 0.63 | 0.63 | 0.63 | 0.63 | 0.63 |
| ZAT-70 | 1.2 | 1.2 | 1.2 | 1.2 | 1.2 | 1.2 | 1.2 |
| OBSH | 3.5 | 3.5 | 3.5 | 3.5 | 3.5 | 3.5 | 3.5 |

TABLE 4

|  | Example | | | | Comparative Example | | |
| --- | --- | --- | --- | --- | --- | --- | --- |
|  | 5 | 6 | 7 | 8 | 4 | 5 | 6 |
| Density | 0.51 | 0.52 | 0.49 | 0.48 | 0.52 | 0.51 | 0.45 |
| Break strength (MPa) | 2.34 | 2.45 | 2.25 | 2.24 | 2.49 | 2.44 | 2.06 |
| Elongation at break (%) | 250 | 240 | 240 | 230 | 26 | 2.60 | 240 |
| Compressive permanent strain (%) | 13.6 | 13.8 | 13.1 | 13.2 | 14.1 | 14.7 | 14.4 |

From the above, it can be understood that the foamed article of the present invention has (i) an excellent balance between BIT, which is an index of kneading processability, and a residual compression stress ratio, which is an index of a shape retaining property, and also (ii) similar characteristics to those of a foamed article comprising conventional copolymer rubber.

Examples 9–12, and Comparative Examples 7–9

1. Production of Compositions

Components between the copolymer rubber-1 and the paraffin oil (2) shown in Table 5 (part by weight) were kneaded for 5 minutes at 60 rpm in a 1.7 liter-volume Banbury type mixer, BB-2 MIXER, manufactured by Kobe Steel, Ltd. After cooling the obtained kneaded product to room temperature, the kneaded product was wounded around a 10 inch-open roll regulated at 40° C., and then, components between sulfur and DPPT shown therein were mixed to obtain respective compositions.

Here, FEF carbon was Asahi 60G manufactured by Asahi Carbon Co., Ltd.; paraffin oil was DIANA PS-430 manufactured by Idemitsu Kosan Co., Ltd.; ZBDC-80 as a vulcanization accelerator was a master batch manufactured by Rhein Chemie Co.; TMTD-80 as a vulcanization accelerator was tetramethylenethiuram disulfide master batch manufactured by Rhein Chemie Co.; MBT-80 as a vulcanization accelerator was 2-mercaptobezothiazole master batch manufactured by Rhein Chemie Co.; and DPTT-70 as a vulcanization accelerator was dipentamethylenethiuram tetrasulfide master batch manufactured by Rhein Chemie Co.

2. Vulcanization

The above-mentioned respective compositions were press-vulcanized at 170° C. for 10 minutes to obtain sheet-like vulcanized rubber having a size of 150 mm×150 mm×2 mm (thickness), and a cylindrical sample having a diameter of 29 mm and a height of 12.5 mm for a compressive permanent strain test, respectively.

3. Property of Vulcanized Rubber

They were measured by the following methods.

(1) Tensile Property

It was measured according to JIS K-6251 using a sample prepared from the above-mentioned sheet-like vulcanized rubber with a JIS No. 3 dumbbell. Results are shown in Table 6.

(2) Compressive Permanent Strain

It was measured according to JIS K-6262 using the above-mentioned cylindrical sample. Results are shown in Table 6.

(3) Hardness

It was measured according to JIS K-6253 using the above-mentioned cylindrical sample. Results are shown in Table 6.

TABLE 5

|  | Example | | | | Comparative Example | | |
| --- | --- | --- | --- | --- | --- | --- | --- |
|  | 9 | 10 | 11 | 12 | 7 | 8 | 9 |
| Copolymer rubber-1 | 100 | — | — | — | — | — | — |
| Copolymer rubber-2 | — | 100 | — | — | — | — | — |
| Copolymer rubber-3 | — | — | 100 | — | — | — | — |

TABLE 5-continued

|  | Example | | | | Comparative Example | | |
|---|---|---|---|---|---|---|---|
|  | 9 | 10 | 11 | 12 | 7 | 8 | 9 |
| Copolymer rubber-4 | — | — | — | 100 | — | — | — |
| Copolymer rubber-5 | — | — | — | — | 100 | — | — |
| Copolymer rubber-6 | — | — | — | — | — | 100 | — |
| Copolymer rubber-7 | — | — | — | — | — | — | 100 |
| Stearic acid | 1 | 1 | 1 | 1 | 1 | 1 | 1 |
| Zinc oxide | 5 | 5 | 5 | 5 | 5 | 5 | 5 |
| FEF carbon | 100 | 100 | 100 | 100 | 100 | 100 | 100 |
| Paraffin oil | 60 | 60 | 60 | 60 | 60 | 60 | 60 |
| Sulfur (curing agent) | 1.5 | 1.5 | 1.5 | 1.5 | 1.5 | 1.5 | 1.5 |
| ZBDC-80 | 2.5 | 2.5 | 2.5 | 2.5 | 2.5 | 2.5 | 2.5 |
| TMTD-80 | 0.63 | 0.63 | 0.63 | 0.63 | 0.63 | 0.63 | 0.63 |
| MBT-80 | 1.25 | 1.25 | 1.25 | 1.25 | 1.25 | 1.25 | 1.25 |
| DPTT-70 | 0.71 | 0.71 | 0.71 | 0.71 | 0.71 | 0.71 | 0.71 |

TABLE 6

|  | Example | | | | Comparative Example | | |
|---|---|---|---|---|---|---|---|
|  | 9 | 10 | 11 | 12 | 7 | 8 | 9 |
| Hardness(Duro-A) | 69 | 68 | 69 | 69 | 70 | 70 | 69 |
| Break strength (MPa) | 14.8 | 14.8 | 14.3 | 14.4 | 15.3 | 15.3 | 14.1 |
| Elongation at break (%) | 270 | 260 | 260 | 240 | 270 | 290 | 260 |
| Compressive permanent strain (%) | 14.4 | 13.8 | 14.4 | 14.6 | 12.7 | 13.5 | 13.7 |

From the above, it can be understood that the vulcanized rubber of the present invention, the profile extrusion molded rubber thereof and the hose for water thereof have (i) an excellent balance between BIT, which is an index of kneading processability, and a residual compression stress ratio, which is an index of a shape retaining property, and also (ii) similar characteristics to those of vulcanized rubber, profile extrusion molded rubber and a hose for water comprising conventional copolymer rubber.

The invention claimed is:

1. An ethylene-α-olefin-non-conjugated diene copolymer rubber satisfying the following requirements (1) to (4):
    (1) a ratio of a Z-average molecular chain length (Az) measured according to a gel permeation chromatography to a number average molecular chain length (An), Az/An, of the ethylene-α-olefin-non-conjugated diene copolymer rubber is from 20 to 30,
    (2) a ratio of a weight average molecular chain length (Aw), which is an index of a molecular weight distribution, to the number average molecular chain length (An), Aw/An, of the ethylene-α-olefin-non-conjugated diene copolymer rubber is more than 5,
    (3) a unimodal or bimodal molecular weight distribution structure having a molecular chain length component, which component is present in a maximum amount in a range of $3.8 < \log Aw < 4.5$, exists in the ethylene-α-olefin-non-conjugated diene copolymer rubber, and
    (4) a viscosity ($ML_{1+4}$, 121° C.) of the ethylene-α-olefin-non-conjugated diene copolymer rubber measured with a ML viscometer is more than 60 and less than 160.

2. The ethylene-α-olefin-non-conjugated diene copolymer rubber according to claim 1, wherein a ratio by weight of an ethylene unit to an α-olefin unit contained in said copolymer rubber is from 80/20 to 45/55, and a content of a non-conjugated diene unit contained therein is from 5 to 35 in an iodine value.

3. The ethylene-α-olefin-non-conjugated diene copolymer rubber according to claim 1, wherein the non-conjugated diene contains 5-ethylidene-2-norbornene or a combination thereof with dicyclopentadiene, 5-vinyl-2-norbornene or norbornadiene.

4. The ethylene-α-olefin-non-conjugated diene copolymer rubber according to claim 1, wherein a ratio of the Z-average molecular chain length (Az) to a residual compressive stress ratio, Az/residual compressive stress ratio, is not more than 2700, wherein the residual compressive stress ratio is measured by a method comprising the steps of:
    (i) compressing said copolymer rubber at 80° C. by 50%,
    (ii) after 0.01 second, measuring its stress ($S_{0.01}$),
    (iii) after 100 seconds, measuring its stress ($S_{100}$), and
    (iv) calculating a formula, residual compressive stress ratio=$S_{100}/S_{0.01}$.

5. A foamed article comprising a copolymer rubber mentioned in claim 1.

6. A process for producing a foamed article, which comprises the step of foaming under vulcanization a composition containing:
    (i) 100 parts by weight of an ethylene-α-olefin-non-conjugated diene copolymer rubber mentioned in claim 1,
    (ii) from 50 to 200 parts by weight of carbon black,
    (iii) from 30 to 150 parts by weight of a softening agent, and
    (iv) from 2 to 15 weight of a foaming agent.

7. Vulcanized rubber comprising a copolymer rubber mentioned in claim 1.

8. A process for producing vulcanized rubber, which comprises the step of vulcanizing a composition containing:
    (i) 100 parts by weight of an ethylene-α-olefin-non-conjugated diene copolymer rubber mentioned in claim 1,
    (ii) from 30 to 250 parts by weight of carbon black, and
    (iii) from 30 to 200 parts by weight of a softening agent.

9. Profile extrusion molded rubber comprising a copolymer rubber mentioned in claim 1.

10. A process for producing profile extrusion molded rubber, which comprises the step of vulcanizing a composition containing:
    (i) 100 parts by weight of an ethylene-α-olefin-non-conjugated diene copolymer rubber mentioned in claim 1,
    (ii) from 30 to 250 parts by weight of carbon black, and
    (iii) from 30 to 200 parts by weight of a softening agent.

11. A hose for water comprising a copolymer rubber mentioned in claim 1.

12. A process for producing a hose for water, which comprises the step of vulcanizing a composition containing:
(i) 100 parts by weight of an ethylene-α-olefin-non-conjugated diene copolymer rubber mentioned in claim 1,
(ii) from 30 to 250 parts by weight of carbon black, and
(iii) from 30 to 200 parts by weight of a softening agent.

* * * * *